(12) United States Patent
Feng

(10) Patent No.: US 12,486,145 B2
(45) Date of Patent: Dec. 2, 2025

(54) BUFFER TYPE SPEED DIFFERENCE FALLING PROTECTOR

(71) Applicant: JINHUA JECH TOOLS CO., LTD, Zhejiang (CN)

(72) Inventor: Ming Feng, Zhejiang (CN)

(73) Assignee: JINHUA JECH TOOLS CO., LTD, Jinhua (CN)

( * ) Notice: Subject to any disclaimer, the term of this patent is extended or adjusted under 35 U.S.C. 154(b) by 910 days.

(21) Appl. No.: 17/715,946

(22) Filed: Apr. 7, 2022

(65) Prior Publication Data

US 2022/0234868 A1 Jul. 28, 2022

Related U.S. Application Data

(63) Continuation-in-part of application No. PCT/CN2020/073565, filed on Jan. 21, 2020.

(30) Foreign Application Priority Data

Nov. 14, 2019 (CN) .......................... 201911111202.2

(51) Int. Cl.
    *B66C 15/02* (2006.01)
    *A62B 1/10* (2006.01)
    (Continued)

(52) U.S. Cl.
    CPC ................ *B66C 15/02* (2013.01); *A62B 1/10* (2013.01); *A62B 35/0093* (2013.01); *A62B 35/04* (2013.01); *B66C 15/00* (2013.01)

(58) Field of Classification Search
    CPC ..... B66C 15/02; B66C 15/00; A62B 35/0093; A62B 1/10; A62B 35/04; F16D 41/18
    (Continued)

(56) References Cited

U.S. PATENT DOCUMENTS 5,186,289 A * 2/1993 Wolner ................... F16D 59/00
                                                188/65.1
5,287,950 A * 2/1994 Feathers ............ A62B 35/0093
                                                192/223.4

(Continued)

FOREIGN PATENT DOCUMENTS

CN        201006209 Y       1/2008
CN        202988469 U       6/2013
(Continued)

OTHER PUBLICATIONS

International Search Report of PCT Patent Application No. PCT/CN2020/073565 issued on Jun. 30, 2020.

*Primary Examiner* — Brent W Herring

(57) ABSTRACT

A buffer type speed difference falling protector includes a shell, a speed difference falling protector body and a speed difference falling protector body, wherein the shell is provided with an opening; the frame body is arranged in the shell; the winding device is arranged on the frame body, can wind the rope body when the winding device rotates in the forward direction, and releases the rope body when the winding device rotates in the reverse direction; and the elastic resetting piece is used for driving the winding device to rotate in the positive direction. The plurality of pawls are arranged on the fixing piece, when the braking device rotates, the plurality of pawls are thrown out synchronously to be contacted with the ratchets, the braking speed is high, the braking reliability is high, and the plurality of pawls can equally divide the impact force during braking.

11 Claims, 9 Drawing Sheets

(51) Int. Cl.
  *A62B 35/00* (2006.01)
  *A62B 35/04* (2006.01)
  *B66C 15/00* (2006.01)

(58) Field of Classification Search
  USPC .......................................................... 182/231
  See application file for complete search history.

(56) References Cited

U.S. PATENT DOCUMENTS

| | | | | |
|---|---|---|---|---|
| 6,148,979 | A | * | 11/2000 | Roach ..................... F16D 43/16 74/577 M |
| 7,281,620 | B2 | * | 10/2007 | Wolner ................. F16D 63/006 192/223.1 |
| 8,567,562 | B2 | * | 10/2013 | Meillet .................... A62B 1/10 182/232 |
| 2010/0224448 | A1 | * | 9/2010 | Wolner .................... A62B 1/10 182/234 |
| 2022/0161071 | A1 | * | 5/2022 | Hung ....................... A62B 1/18 |
| 2023/0217860 | A1 | * | 7/2023 | Chen ....................... F16D 23/12 56/14.7 |
| 2023/0271038 | A1 | * | 8/2023 | Schrank ............. A62B 35/0093 182/232 |
| 2023/0271039 | A1 | * | 8/2023 | Shrank ............... A62B 35/0093 182/232 |

FOREIGN PATENT DOCUMENTS

| | | |
|---|---|---|
| CN | 203971231 U | 12/2014 |
| CN | 205885999 U | 1/2017 |
| CN | 206910618 U | 1/2018 |
| CN | 208481899 U | 2/2019 |
| CN | 211644386 U | 10/2020 |

* cited by examiner

BUFFER TYPE SPEED DIFFERENCE FALLING PROTECTOR

CROSS REFERENCE TO RELATED APPLICATIONS

The present application is a Continuation-In-Part Application of PCT Application No. PCT/CN2020/073565 filed on Jan. 21, 2020, which claims the benefit of Chinese Patent Application No. 201911111202.2 filed on Nov. 14, 2019. All the above are hereby incorporated by reference in their entirety.

FIELD OF THE INVENTION

The present invention belongs to the technical field of safety tools, and particularly relates to a buffer type speed difference falling protector.

BACKGROUND OF THE INVENTION

Speed difference falling protectors can quickly brake and lock falling objects within a limited distance, which are suitable for cargo hoisting, can protect the life safety of operators on the ground and prevent damage to the lifted workpieces. It is suitable for safety protection to prevent the lifted workpieces from falling accidentally, and can effectively protect the life safety of operators on the ground and prevent damage to the lifted workpieces. It is used in high-altitude workplaces in the fields of metallurgy, automobile manufacturing, petrochemical industry, engineering construction, electricity, ships, communications, pharmaceuticals, and bridge engineering, etc.

The existing speed difference falling protectors have the following advantages: firstly, the speed difference falling protectors the markets realize the braking functions by using a pawl and a ratchet limit. Since a pawl is used for braking, all the gravity will be applied to the pawl. At this time, the impact force applied on the pawl is large, its braking effect is unstable, and it is prone to slippage or pawl breakage, with a low safety; secondary, the brake friction lining and reel of the speed difference falling protector on the markets are integrated together with screws. The friction resistance of the friction lining is completely determined by the tightening force of the screws. The size of the friction force is not easy to control, which causes the buffer force of the buffer type speed difference falling protector not to be easily controlled; thirdly, since the conventional speed difference falling protector uses only one pawl for braking, a buffer pack is designed to reduce the impact; however, with the design of the buffer pack, the falling protector has an increased volume and is inconvenient to carry; in addition, due to dependence on the performance of buffer pack, the safety is low.

SUMMARY OF THE INVENTION

In order to overcome the defects in the prior art, the present invention provides a buffer type speed difference falling protector with good multi-braking effect and high safety.

In order to achieve the above object, the present invention adopts the following technical solution. A buffer type speed difference falling protector comprises:
  a shell which is provided with an opening;
  a frame body which is arranged in the shell;
  a winding device which is arranged on the frame body, wherein a rope body can be wound when the winding device rotates in the forward direction, and the rope body is released when the winding device rotates in the reverse direction;
  an elastic resetting piece which is used for driving the winding device to rotate in the forward direction;
  a braking device which is arranged on the frame body and comprises a locking seat with a plurality of ratchets, a fixing piece capable of rotating synchronously with the winding device, a plurality of pawls rotationally arranged on the fixing piece and elastic pieces connected with the pawls, wherein when the fixing piece rotates to enable the centrifugal force generated by the pawls to be larger than the elastic force of the elastic pieces, the pawls are meshed with the ratchets to brake the winding device; and
  a braking piece which is matched with the winding device through a multi-thread structure, wherein the braking piece rotates synchronously with the winding device and is tightly attached to the braking device.

In the present invention, the plurality of pawls are arranged on the fixing piece, thus when the braking device rotates, the pawls are thrown out synchronously to be contacted with the ratchets at the same time, the pawls and the ratchets are limited at the same time to achieve the braking effect, the braking speed is high, and the reliability during braking is high. In addition, the pawls are arranged to form multiple protection, even if one pawl is loosened or broken, the other pawls make contact with the fixing piece, the braking effect is good, and the safety is improved in a multiplied mode. The pawls bear impact force equally, so that vibration formed on parts in the shell is small, and the stability of the parts after being connected is high. The pawls are adopted for synchronous locking, thus the pawls bear pull force equally with the rope, the force borne by each pawl is small, and the service life of the pawls is prolonged. Due to the fact that the plurality of pawls are provided, when the pawls are thrown out, the pawls can balance centrifugal force mutually, the fixing piece cannot bear the pull force towards one side, the fixing piece cannot be loosened even after being used for multiple times, the firmness and stability of the fixing piece after being mounted can be improved, and then the safety of the braking device during braking is improved. The pressure between the braking piece and the braking device is kept constant under the fixing of a multi-thread structure, so that in the process that the winding device is driven by gravity to rotate slowly, the friction force between the braking piece and the braking device of each falling protector is constant, the rotating speed of the winding device is constant when each set of falling protectors slips, objects hung on the falling protectors are put down slowly, and the high safety of the falling protectors produced by mass in the using process is guaranteed.

Optionally, a ratchet groove allowing each pawl to be inserted is formed between every two adjacent ratchets, each pawl is provided with a cantilever section extending in the direction away from the rotating center of the pawl, each cantilever section is provided with a first side edge and a second side edge, and a plane perpendicular to the axis of a fixing piece serves as a reference plane. The end, away from the rotating center of the corresponding pawl, of each cantilever section is provided with a tip capable of being clamped into the corresponding ratchet groove, each tip is provided with a first cut edge connected with the corresponding first side edge, and the included angle between the projection of each first cut edge on the reference plane and the projection of each first side edge on the reference plane is set to be β1. The inner wall of each ratchet groove is of a polygonal structure, a first guide edge, a second guide edge, a third guide edge and a flange are sequentially arranged on each ratchet groove in the reverse rotating direction of the fixing piece, and each ratchet is composed of the flange and the first guide edge of the adjacent ratchet groove. The included angle between the projection of each first guide edge on the reference plane and the projection of each second guide edge on the reference plane is set to be β2, the included angle between the projection of each second guide edge on the reference plane and the projection of each third guide edge on the reference plane is set to be β3, wherein 90°<β1<β2<β3.

Optionally, 0<(β2−β1)≤30°, 0<(β3−β1)≤45°.

Optionally, the second cut edges capable of abutting against the ratchets are arranged at the tips, the plane perpendicular to the axis of the fixing piece serves as a reference plane, the included angle between the projection of each second cut edge on the reference plane and the projection of each second side edge on the reference plane is set to be θ, wherein 140°≤θ<180°.

Optionally, a gasket is arranged between the locking seat and the frame body, the thickness of the locking seat in the axis direction of the fixing piece is D1, the thickness of each pawl in the axis direction of the fixing piece is D2, wherein D1:D2=(1-3): 1.

Optionally, the plane perpendicular to the axis of the fixing piece serves as the reference plane, the included angle between the projections of the two side walls of the ratchets on the reference plane is α, wherein 25°≤α≤45°.

Optionally, a protruding portion used for limiting the pawls is arranged on the fixing piece, the plane perpendicular to the axis of the fixing piece serves as the reference plane, the projection of the axis of the fixing piece on the reference plane serves as a center point C1, the projections of the two ends of the protruding portion on the reference plane serve as the connecting line C1C2 and the connecting line C1C3 with the center point C1, the included angle between C1C2 and C1C3 is γ, wherein 10°≤γ≤70°.

Optionally, the winding device comprises a shaft body connected with the fixing piece and a winding structure in anti-rotation connection with the shaft body, and the shaft body is movably connected with the frame body; and/or the winding structure comprises a shaft sleeve arranged on the shaft body in a sleeved manner and a limiting disc used for limiting the rope body, and the limiting disc is connected with the shaft body; and/or the shaft body is provided with a first cutting face, and the shaft sleeve is provided with a second cutting face abutting against the first cutting face.

Optionally, the fixing piece is provided with a friction piece, and the braking piece is tightly attached to the friction piece; and/or the multi-thread structure comprises a multi-thread external thread arranged on the shaft body and a multi-thread internal thread matched with the multi-thread external thread, and the multi-thread internal thread is arranged on the braking piece.

Optionally, the frame body is provided with an anti-scraping structure matched with the rope body, the anti-scraping structure is a rotating roller corresponding to the opening, and the rotating roller is arranged on the lower portion of the frame body; and/or at least three pawls are provided.

In summary, a plurality of pawls are arranged on the fixing piece, when the braking device rotates, the plurality of pawls are thrown out synchronously to be contacted with the ratchets, the braking speed is high, the braking reliability is high, the plurality of pawls can equally divide the impact force during braking, thus, the impact force borne by the interior of the speed difference falling protector is small, and the stability of all parts of the speed difference falling protector is high. The multi-thread external thread structure is used for fixing the braking piece, compared with a traditional screw or single-thread fixing mode, the pressure of the braking piece and the braking device is constant, thus, when the winding device rotates, the rotating speed of the winding device is constant, and the pressure between the braking piece and the friction piece of speed difference falling protectors produced by mass is consistent.

DETAILED DESCRIPTION

Figure 1:
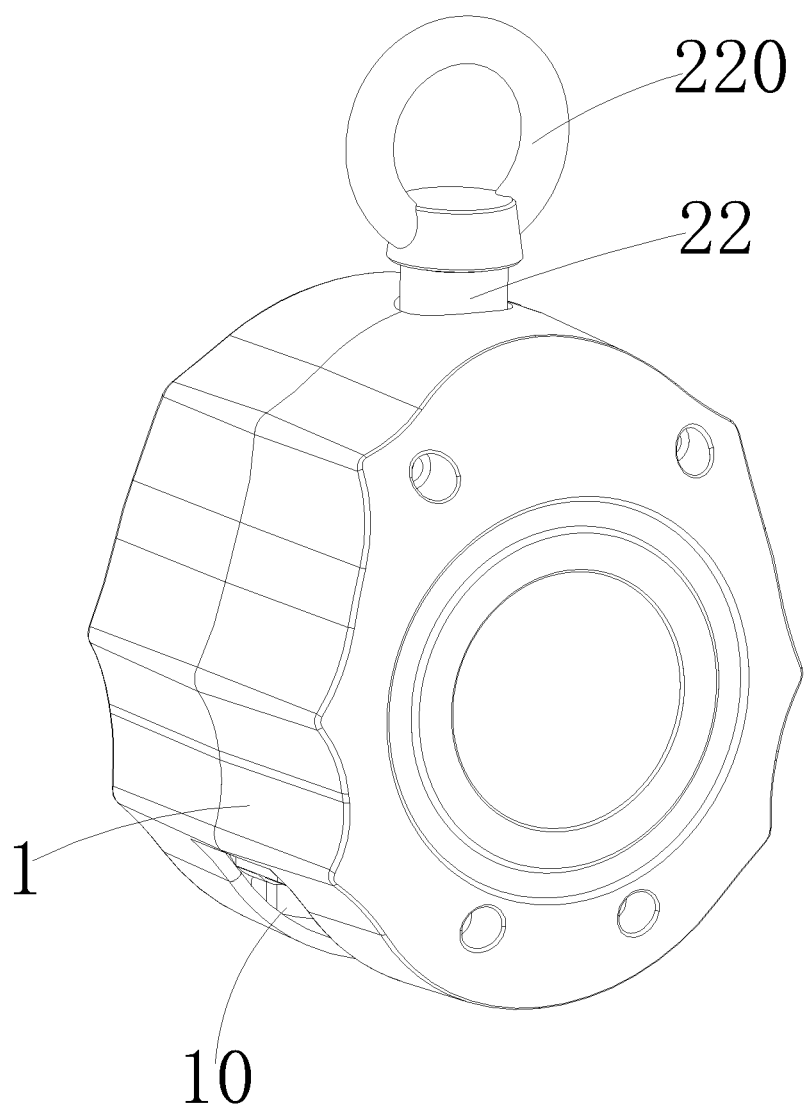
FIG. 1 is a schematic view of the present invention.

In order to enable those skilled in the art to have a better understanding of the solutions of the present invention, the technical solutions in the embodiments of the present invention will be described clearly and completely below with reference to the accompanying drawings in the embodiments of the present invention.

As shown in FIGS. 1 to 12, a speed difference falling protector comprises a shell 1, a frame body 2, a winding device 3, an elastic resetting piece 4 and braking device 5, wherein the shell 1 comprises a first shell 11 and a second shell 12, the first shell 11 is a metal shell, and the second shell 12 is also a metal shell. The first shell 11 and the second shell 12 are connected together by screws to form a hollow shell; the frame body 2 is arranged inside the shell 1, the frame body 2 is an n-shaped metal plate, the upper part of the frame body 2 is connected with a joint 22, and the upper end of the joint 22 is provided with a circular shackle 220, and the shackle 220 is convenient to wind wire ropes or belt ropes. The lower part of the joint 22 is provided with a convex ring 221, the frame body 2 is provided with a circular hole, the lower part of the joint 22 is inserted into the circular hole, the convex ring 221 and the frame body 2 are limited at the same time, such that the joint 22 will not be disengaged upwardly. A circlip 222 is sleeved on the joint 22, the circlip 222 is located on the upper part of the frame body 2, and a plug 223 is inserted into the joint 22. The plug 223 is located on the upper part of the circlip 222, so that the plug 223 limits the circlip 222 to achieve the anti-falling effect.

In some embodiments, the winding device 3 is used for winding a rope body, and the rope body is a belt rope or a wire rope, and the winding device 3 can rotate relative to the frame body 2 in a forward direction and a reverse direction. When the winding device 3 rotates in a forward direction, the rope body can be wound on the winding device 3, and when the winding device 3 rotates in a reverse direction, the rope body will be released; the winding device 3 comprises a shaft body 31 and a winding structure that is sleeved on the shaft body 31, wherein the shaft body 31 is a metal shaft, the shaft body 31 passes through the through hole on the frame body 2, and the shaft body 31 can rotate relative to the frame body 2; the winding structure is located in the middle of the frame body 2, the winding structure 32 is in anti-rotation matching with the shaft body 31; specifically, the winding structure 32 comprises a shaft sleeve 321 and two limiting discs 322, the shaft sleeve 321 is a metal sleeve, and the shaft sleeve 321 is sleeved on the shaft body 31. A first cutting face 310 is arranged on the shaft body 31, and the first cutting face 310 is a plane, and a second cutting face 320 is arranged on the shaft sleeve 321, and the second cutting face 320 is also a plane; the first cutting face 310 is in contact with the second cutting face 320, so as to realize the anti-rotation connection between the shaft sleeve 321 and the shaft body; the limiting disc 322 is a metal disc, and two limiting discs 322 are connected with the shaft sleeve 321 respectively, such that the rope body will be located between the two limiting discs 322 when the rope body is wound around the shaft sleeve 321, which ensures that the belt rope is in a neat state when wound on the winding structure, to facilitate the releasing and winding of the rope body. The rope body is simple in structure and long in service life.

In some embodiments, the elastic resetting piece 4 is a coil spring, and the elastic resetting piece 4 is used to drive the shaft body 31 to rotate forward, so that the winding structure 32 can wind the rope body; the frame body 2 is connected with a protective cover 40 by bolts. The protective cover 40 is a metal cover with a circular chamber. The elastic resetting piece 4 is located in the protective cover 40. One end of the elastic resetting piece 4 is connected to the protective cover 40, and the other end of the elastic resetting piece 4 is connected to the shaft body 31; specifically, the shaft body 31 is provided with a notch 317, and the elastic resetting piece 4 is inserted into the notch 317 as the other end, so as to realize the connection between the elastic resetting piece 4 and one end of the shaft body 31.

In some embodiments, in order to prevent the person on the rope body from falling quickly and hurting due to the sudden and rapid rotation when the winding device 3 rotates in a direction, a braking device 5 is arranged on the frame body 2 for locking the winding device 3. Specifically, the braking device 5 comprises a locking seat 51, a fixing piece 52, a pawl 53 and an elastic piece 54; the locking seat 51 is a metal sheet, and the locking seat 51 is connected with the frame body 2 through bolts; a circular hole is formed on the locking seat 51. A plurality of ratchets 510 is provided on the locking seat 51, and the ratchets 510 are directly cut out of the locking seat 51, and a ratchet groove 511 for pawl insertion is formed between the adjacent ratchets 510; the fixing piece 52 is a metal disc, the fixing piece 52 is connected with the shaft body 31; a plurality of pawls 53 are provided and are metal pawls. The pawls 53 are connected with the fixing piece 52 through bolts and nuts; in this embodiment, specifically, three pawls 53 are provided, and the three pawls 53 are movably connected to the fixing piece 52 at equal spacing, and the braking effect is three times that of the conventional pawls. Therefore, the winding device can be quickly braked, with a good braking effect; the elastic piece 54 is a torsion spring, one end of the elastic piece 54 is connected with the fixing piece 52, and the other end is connected with the pawl 53, the pawl 53 is pulled by the elastic force of the elastic piece 54 to a position that is not in contact with the ratchet 510.

When the rope body is quickly pulled down due to the gravity of the human body, the winding structure drives the shaft body to rotate in the reverse direction. At this time, since the fixing piece is tightly connected with the shaft body, the fixing piece will rotate synchronously with the winding structure at the initial period, at this time, due to the fast rotating speed of the fixing piece, the centrifugal force on the pawl is greater than the elastic force of the elastic piece, so the pawl will be thrown out, and the pawl will be in contact with the ratchet, thereby locking the fixing piece to restrict the fixing piece from continuing to rotate. Thus, the downward movement of the rope body is restricted. By setting a plurality of pawls on the fixing piece, when the braking device rotates, the plurality of pawls are thrown out synchronously to contact the ratchets at the same time, so the plurality of pawls and the ratchets will be limited at the same time, to achieve the braking effect. The braking speed is fast and the reliability is high during braking; Moreover, the plurality of pawls is provided to form multiple protections. Even if a pawl is loosened or broken, there is a plurality of other pawls in contact with the fixing piece, the braking effect is good, and the safety is doubled; furthermore, the plurality of pawls receives the impact force equally, so the vibration to the components inside the shell is small, and the stability of each component after connection is high; and the plurality of pawls is used for synchronous locking, so the plurality of pawls will equally share the tension on the rope body, and the force acted on each pawl is small, which improves the service life of the pawl; and because there are multiple pawls, when the pawls are thrown out, the plurality of pawls will balance the centrifugal force with each other, so the fixing piece will not be pulled towards one side. Therefore, the fixing piece will not be loosened even after multiple uses, which can improve the firmness and stability of the fixing piece after installation, thereby improving the safety of the braking device during braking. In addition, due to the multi-pawl design, multiple protections are formed. In this application, the design of the buffer pack is cancelled, so the falling protector is more compact in overall structure, occupies a small space and is easy to use; and the multi-pawl design achieves the structural stability and high safety.

Figure 2:
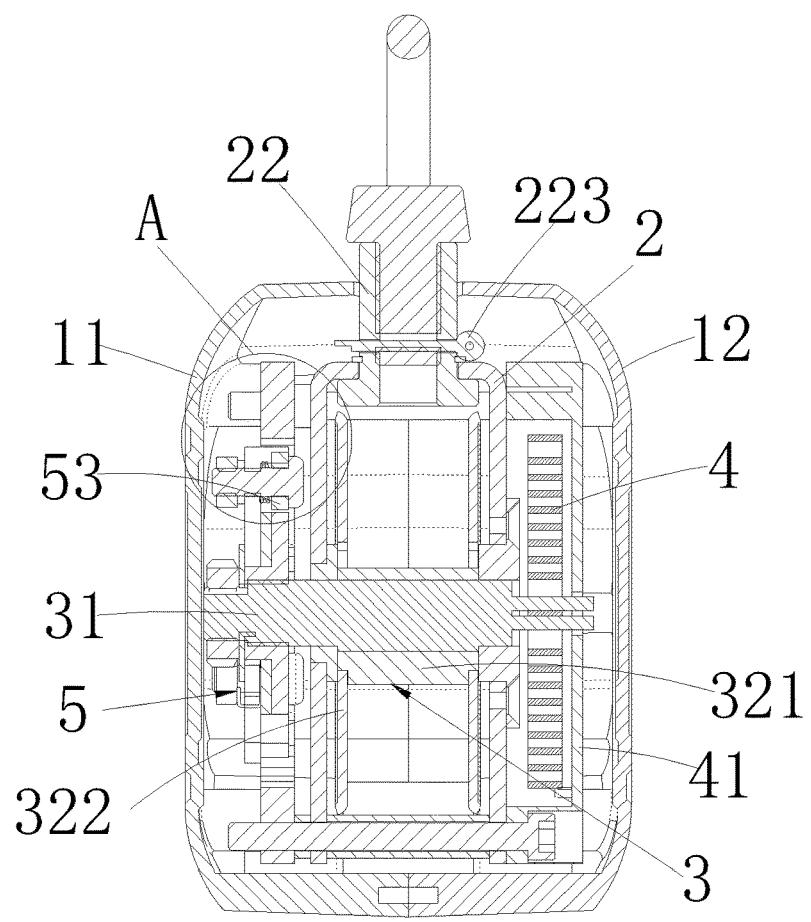
FIG. 2 is a cross-sectional view of the present invention.
Figure 3:
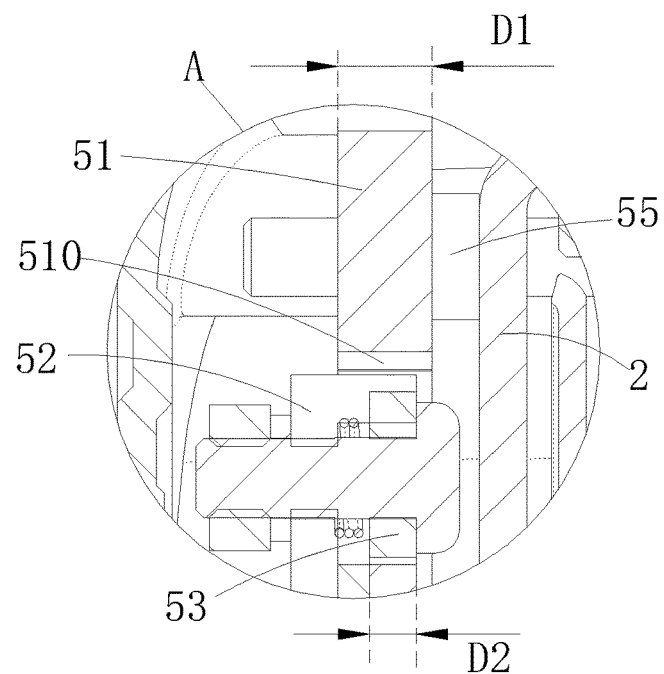
FIG. 3 is the enlarged view of A in FIG. 2.
Figure 4:
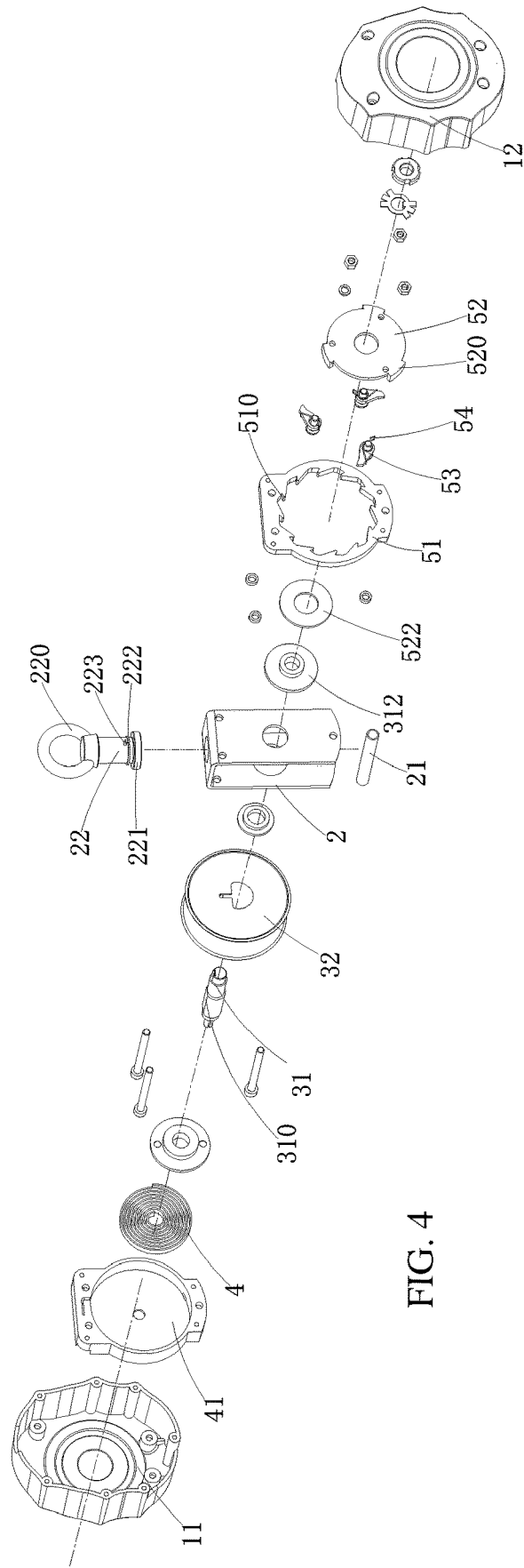
FIG. 4 is an exploded view of the present invention.
Figure 5:
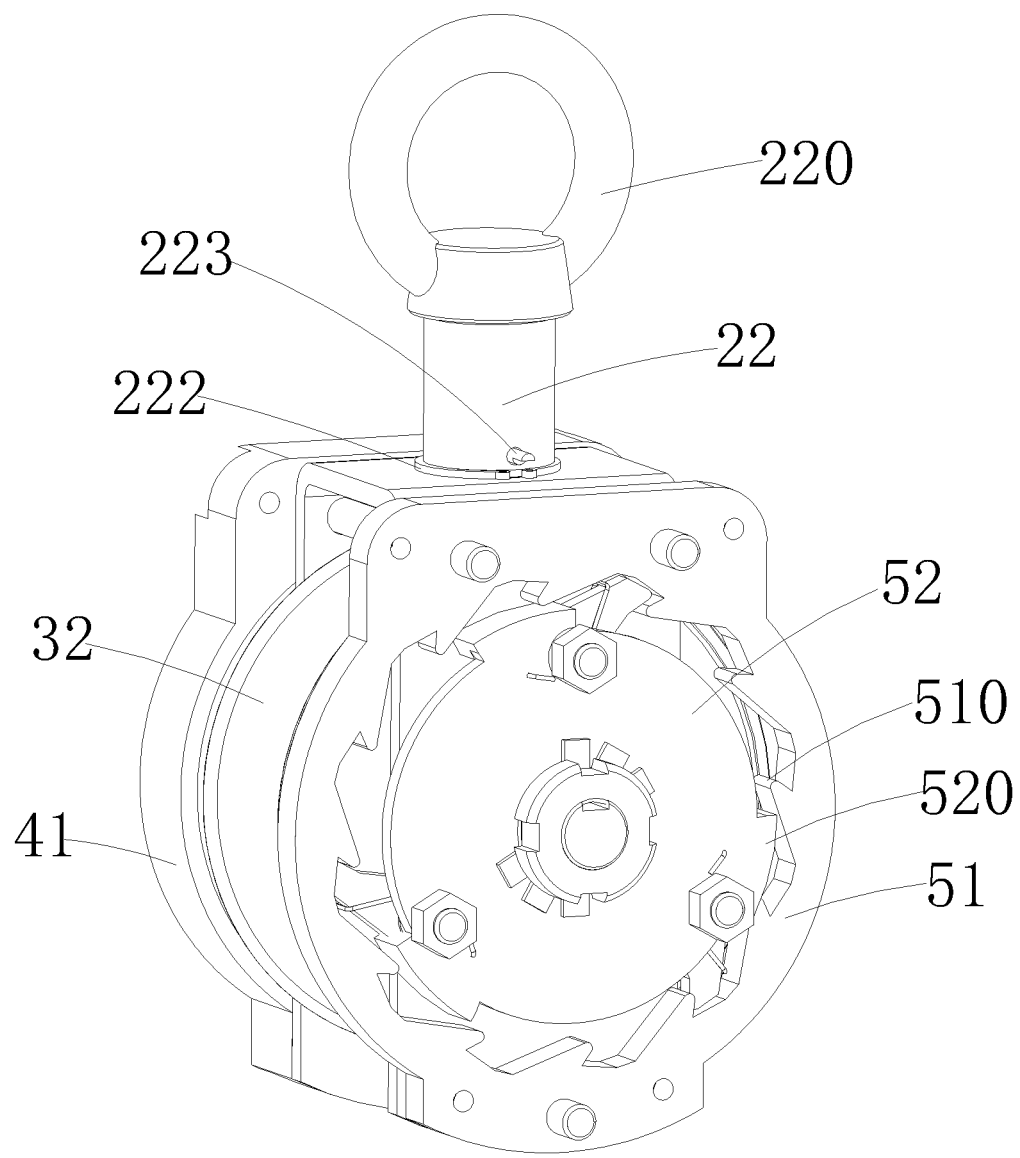
FIG. 5 is a partial schematic view 1 of the present invention.
Figure 6:
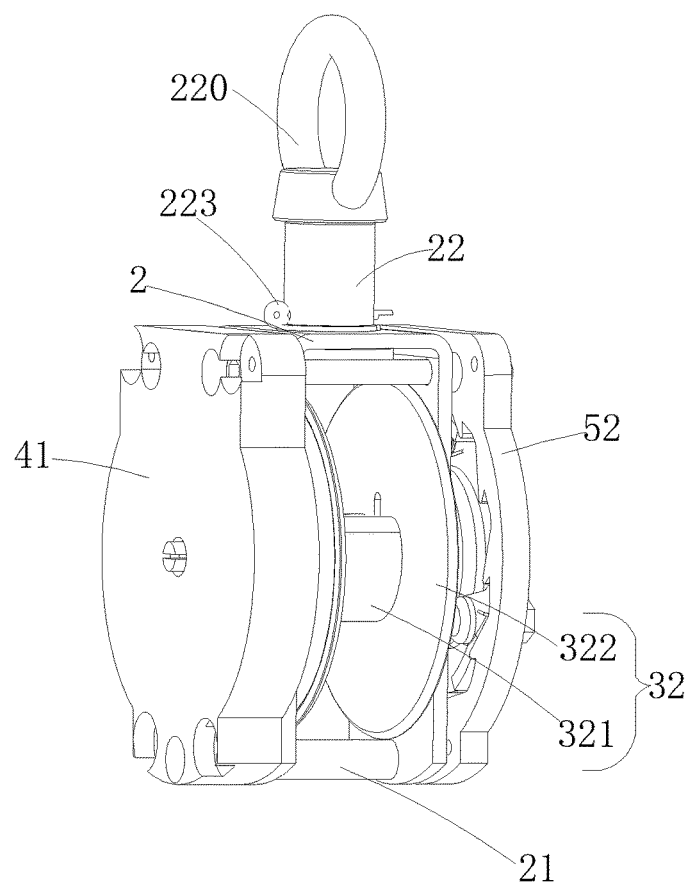
FIG. 6 is a partial schematic view 2 of the present invention.
Figure 7:
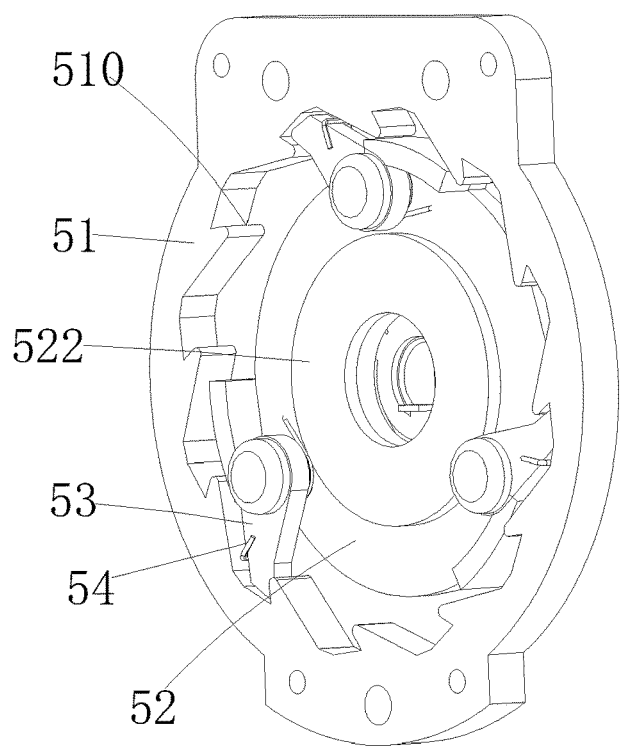
FIG. 7 is a schematic view of a braking device of the present invention.

Referring to FIG. 2 and FIG. 3, in some embodiments, a gasket 55 is arranged between the locking seat 51 and the frame body 2, and the relative position of the locking seat 51 and the pawl can be adjusted by adjusting the thickness of the gasket 55 to ensure that the ratchet is completely aligned with the pawl; the thickness of the locking seat 51 in the axis direction of the fixing piece is D1, the thickness of the pawl 53 in the axis direction of the fixing piece is D2, wherein D1:D2=(1-3): 1; preferably, D1:D2=(1.5-2.5):1; most preferably, D1:D2=2:1; by defining the relationship between D1 and D2, the margin for adjustment of the locking seat 51 is reserved, so that the locking seat 51 can be specifically adjusted according to the position of the pawl 53, to ensure that the pawl 53 can make full contact with the ratchet 510.

Figure 8:
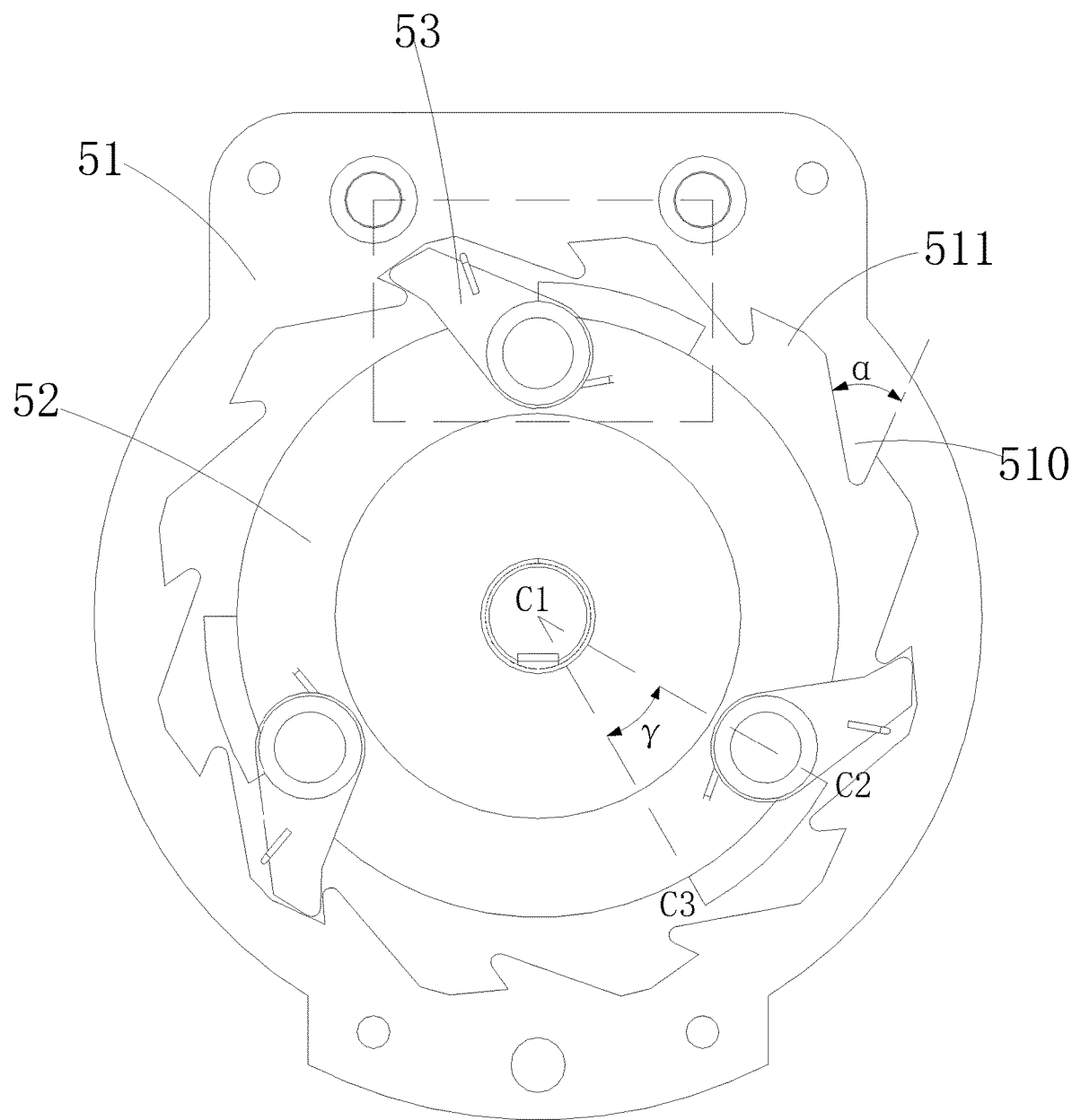
FIG. 8 is a front view of FIG. 7.

Referring to FIG. 8, in some embodiments, the plane perpendicular to the axis of the fixing piece 52 serves as the reference plane, wherein the included angle between the projections of the two side walls of the ratchets on the reference plane is $\alpha$, $25°\leq\alpha\leq45°$; preferably, $30°\leq\alpha\leq40°$; most preferably, $\alpha=35°$. The structural strength of the ratchet 510 is ensured to avoid breakage by the impact of the pawl 53, and the ratchet groove 511 has enough space for snapping-in of the pawl.

Figure 9:
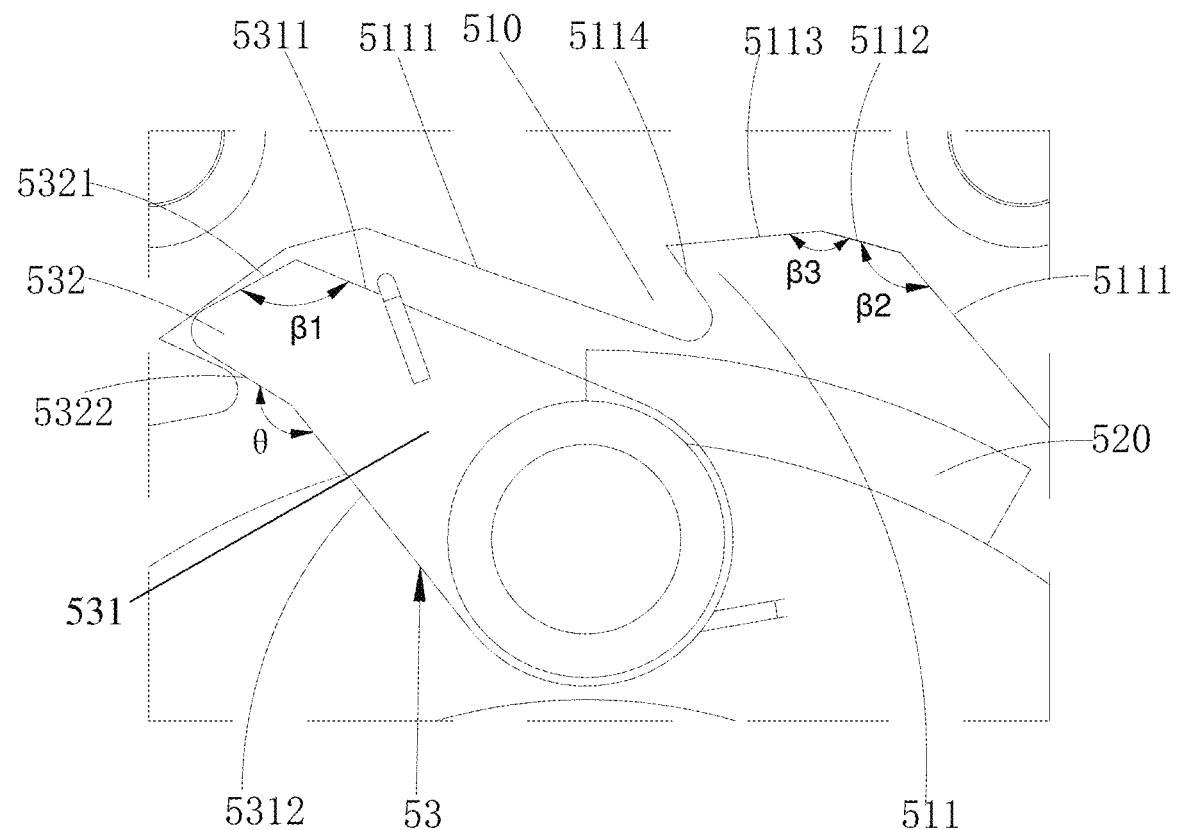
FIG. 9 is a partial schematic view of FIG. 8.
Figure 10:
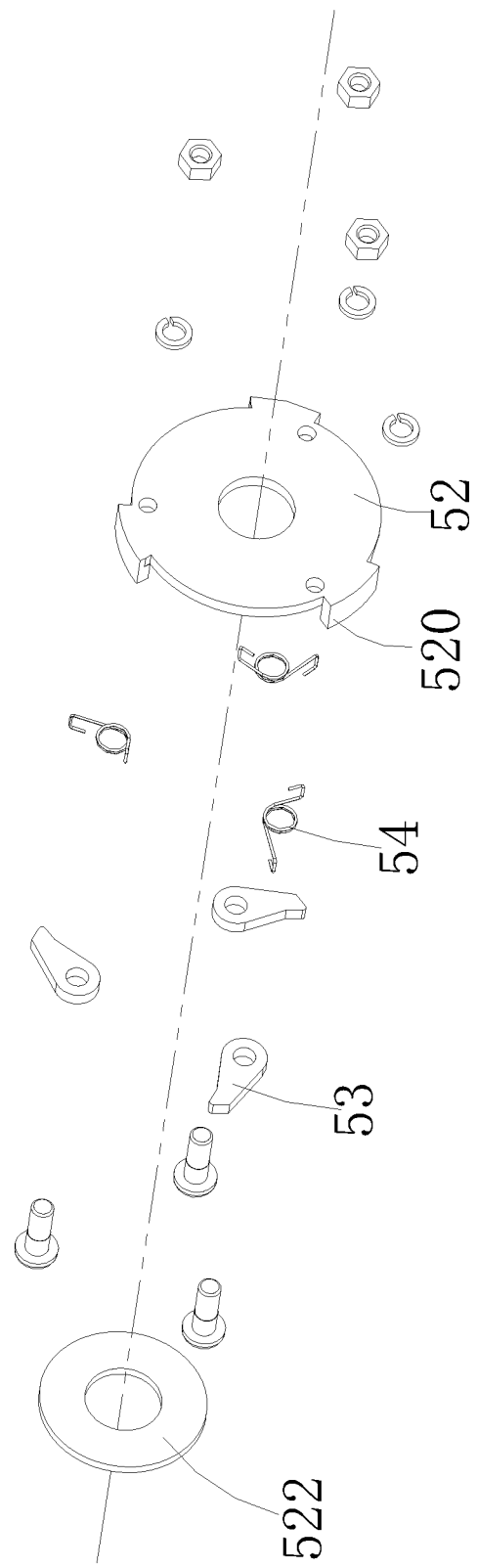
FIG. 10 is an exploded view of a braking device of the present invention.
Figure 11:
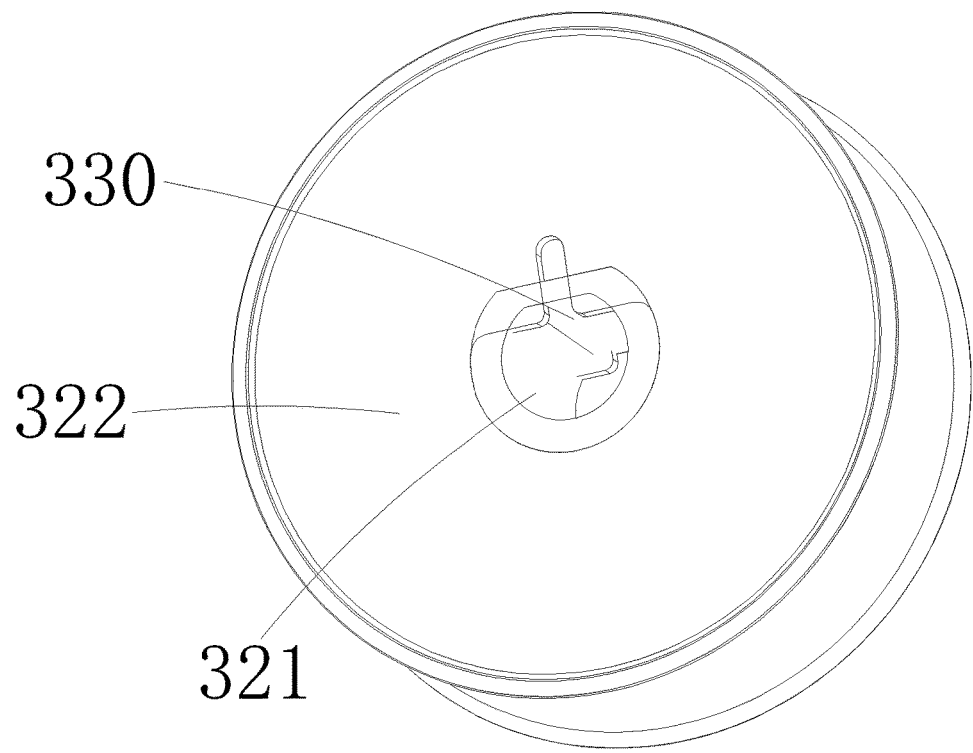
FIG. 11 is a schematic view of a winding structure of the present invention.
Figure 12:
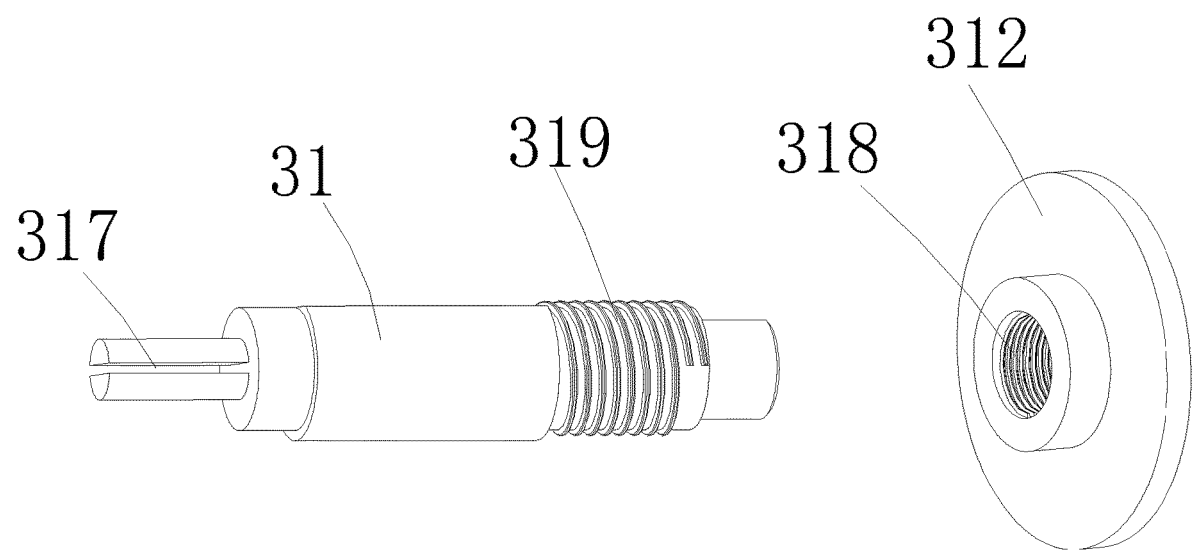
FIG. 12 is a schematic view of a shaft body and a braking piece of the present invention.

Referring to FIG. 8 and FIG. 9, in some embodiments, the pawl 53 is provided with a cantilever section 531 extending in the direction away from the rotating center of the pawl 53, the cantilever section 531 is provided with a first side edge 5311 and a second side edge 5312, and a plane perpendicular to the axis of a fixing piece 52 serves as a reference plane. Wherein, the distance between the projection of the first side edge 5311 and the projection of the second side edge 5312 on the reference plane gradually decreases in the direction away from the rotation center of the pawl 53, which is beneficial for the pawl 53 to be snapped into the ratchet groove 511.

Referring to FIG. 8 and FIG. 9, in some embodiments, the end, away from the rotating center of the corresponding pawl 53, of the cantilever section 531 is provided with a tip 532 capable of being clamped into the corresponding ratchet groove 511, each tip 532 is provided with a first cut edge 5321 connected with the corresponding first side edge 5311, and the included angle between the projection of each first cut edge 5321 on the reference plane and the projection of each first side edge 5311 on the reference plane is set to be $\beta1$; the inner wall of the ratchet groove 511 is of a polygonal structure, a first guide edge 5111, a second guide edge 5112, a third guide edge 5113 and a flange 5114 are sequentially arranged on each ratchet groove 511 in the reverse rotating direction of the fixing piece (the rotation direction when the winding device is released), wherein the ratchet 510 is composed of the flange 5114 and the first guide edge 5111 of the adjacent ratchet groove 511. The included angle between the projection of each first guide edge 5111 on the reference plane and the projection of each second guide edge 5112 on the reference plane is set to be $\beta2$, the included angle between the projection of each second guide edge 5112 on the reference plane and the projection of each third guide edge 5113 on the reference plane is set to be $\beta3$, wherein $90°<\beta1<\beta2<\beta3$. The first guide edge 5111, the second guide edge 5112, the third guide edge 5113 guide the pawl stuck in ratchet groove 511, and then remove the impact force of pawl in stages, thereby reducing the impact on ratchets and pawl 53, to prevent breakage and improve safety; by setting $\beta1<\beta2<\beta3$, the tip is prevented from being stuck in the inner wall of ratchet groove 511, to ensure that the tip can slide smoothly along the first guide edge 5111, second guide edge 5112, third guide edge 5113 until it abuts against the flange 5114; in addition, $\beta1$, $\beta2$ and $\beta3$ are all set to obtuse angles, to ensure that the tip 532 is not stuck in the inner wall of the ratchet groove 511, reduce the farthest distance between the inner wall of the ratchet groove 511 and the axis of the fixing piece, ensure that the locking seat 51 has sufficient structural strength and reduce the projected area of the locking seat on the reference plane, so that the braking device is more compact, thereby reducing the overall volume of the falling protector. Thus, the falling protector of the present application is convenient to receive and occupies less space, and is convenient to carry.

Referring to FIG. 8 and FIG. 9, in some embodiments, $0<(\beta2-\beta1)\leq30°$, $0<(\beta3-\beta1)\leq45°$, preferably, $10°\leq(\beta2-\beta1)\leq20°$, $20°\leq(\beta3-\beta1)\leq35°$; most preferably, the $(\beta2-\beta1)=16.7°$, $(\beta3-\beta1)=30°$; while ensuring that tip 532 is not stuck with the inner wall of ratchet groove 511, it is possible to achieve sufficient contact area between the tip 532 and ratchet groove 511, to maximize the dispersion of the impact force generated when the tip 532 is in contact with the ratchet groove 511.

Referring to FIG. 8 and FIG. 9, in some embodiments, a second cut edge 5322 is arranged on the tip 532, and the second cut edge 5322 abuts against a ratchet when the pawl 53 is stuck in the ratchet groove 511. The plane perpendicular to the axis of the fixing piece 52 serves as a reference plane, the included angle between the projection of each second cut edge 5322 on the reference plane and the projection of each second side edge 5312 on the reference plane is set to be $\theta$, wherein $140°\leq\theta<180°$; preferably, $150°\leq\theta\leq170°$; most preferably, $\theta=160°$; by defining the included angle between the second cut edge and the second side edge, the tip protrudes in the direction away from the first side edge 5311, which improves the impact strength of the pawl and makes the pawl not to break easily.

In some embodiments, in order to ensure that the pawl will not move in a reserve direction excessively when the pawl is in contact with the ratchet 510, a plurality of protruding portions 520 are arranged on the fixing piece 52, and the protruding portions 520 correspond to the pawls 53 one to one, thereby limiting the rotation angle of the pawls 53 and ensuring that the winding structure 32 will not continue to rotate; when the pawl 53 is thrown out, the pawl 53 will abut against the protruding portion 520, so the pawl 53 cannot continue to move outwards. Thus, when the pawl 510 is in contact with the ratchets 510, the pawl 53 will not be loosened during the braking, with a high stability; in this embodiment, three protruding portions are provided, and the three protruding portions 520 are arranged in equal spacing along the circumferential direction of the fixing piece.

Referring to FIG. 8, in some embodiments, the protruding portion 520 is set as an arc, and is located at the edge of the fixing piece 52. The plane perpendicular to the axis of the fixing piece 52 serves as the reference plane, the projection of the axis of the fixing piece 52 on the reference plane serves as a center point C1, the projections of the two ends of the protruding portion 520 on the reference plane serve as the connecting line C1C2 and the connecting line C1C3 with the center point C1, the included angle between C1C2 and C1C3 is $\gamma$, and $10°\leq\gamma\leq70°$; preferably, $20°\leq\gamma\leq40°$; most preferably, $\gamma=30°$. By setting the included angle $\gamma$ to limit the arc length of the protruding portion 520 on the fixing piece 52, the structural strength of the protruding portion is ensured, and the protruding portion is prevented from being broken by impact; in addition, there is sufficient spacing between the adjacent protruding portions to prevent the pawl from interfering with the protruding portion that is matched with the adjacent pawl during the rotation.

In some embodiments, after the rope body is locked by the ratchet 510 and the pawl 53, the rope body can still slowly fall down. A friction piece 522 is pasted on the back of the fixing piece 52, and the friction piece 522 is a disc; the friction piece 522 is sleeved on the shaft body 31 together with the fixing piece 52; a braking piece 312 is sleeved on the shaft body 31, and the braking piece 312 is a nut with a convex cross section. The braking piece 312 is screwed with the shaft body 31, and the braking piece 312 abuts against the friction piece 522. The "abut against" means that the braking piece is tightly attached to the friction piece 522. The fixing piece 52 rotates synchronously with the shaft body 31 under the action of static friction between the braking piece and the friction piece 522. By setting a friction piece, after the winding structure is braked by the braking piece, the winding device will still rotate slowly to slowly put down the materials on the rope body since the lower end of the rope body is still subject to weight, while the friction piece increases the force of friction between the fixing piece and the braking piece, so the winding structure rotates slowly when pulled by the rope body. In addition, when a person hanging on the rope body falls, the pawl will be stuck on the ratchet under the action of a centrifugal force. Due to the action of gravity and inertia, together with the sudden stop by falling up and down, the impact on the human body is very large. In this application, through the cooperation between the braking piece and the friction piece, after the pawl 53 is locked by the ratchet 510, the braking piece will move toward the direction of the fixing piece relative to the shaft body under the action of friction piece, until the position of braking piece is completely locked, thus, the pawl 53 of the braking piece will continue to rotate with the winding device after locked by the ratchet 510, to buffer a certain distance, and reduce the impact force on the human body when falling, with a high safety; in addition, buffering is carried out through the cooperation of the braking piece and the friction piece, and the buffer structure is integrated into the braking device, which further improves the safety protection effect and can replace the buffer pack on the conventional falling protector.

In some embodiments, in order to ensure a constant pressure of the braking piece 312 on the friction piece 522, the shaft body 31 and the braking piece 312 are connected together by a multi-thread structure. The multi-thread structure comprises a multi-thread external thread 319 arranged on the shaft body 31 and a multi-thread internal thread 318 arranged on the braking piece 312. When the braking piece 312 is connected with the shaft body 31, the multi-thread external thread 319 is engaged with the multi-thread internal thread 318. The pressure between the braking piece and the braking device is kept constant under the fixation of the multi-thread structure, thus, during the slow rotation of the winding device driven by gravity, the frictional force between each braking piece of the failing protector and the braking device is constant. Therefore, when each group of falling protector slips, the rotation rate of the winding device is constant, and the objects hung on the falling protector can be put down slowly, which ensures the high safety of the falling protector during use.

In some embodiments, an opening 10 is provided on the shell 1, and the opening 10 is used for the rope body to protrude from the shell 1; in order to ensure that the service life of the rope body is affected by the friction between the rope body and the opening 10 when the rope body is protruding from the opening 10, an anti-scraping structure is arranged at the position corresponding to the opening 10. By setting the anti-scraping structure, it ensures that the rope body will not be in contact with the opening when the rope body is pulled down, so the rope body will not be worn, prolonging the service life of the rope body; and the rope body is not scratched, so the rope body will not be disconnected, and its stability is high. In this embodiment, the anti-scraping structure is a rotating roller 21, the rotating roller 21 is sleeved on a metal bolt; the rotating roller 21 is arranged at the lower part of the frame body 2, and the rope body will be in contact with the rotating roller 21; by setting the anti-scraping structure as a rotating roller, the structure is simple. When the rope body is pulled down, the rotating roller will rotate, and the friction between the rotating roller and the rope body is small, with a good protection effect on the rope body.

Apparently, embodiments described are only a part of embodiments of the present invention, and are not all of embodiments thereof. All other embodiments obtained by persons of ordinary skill in the art based on the embodiments of the present invention without creative efforts shall fall within the protection scope of the present invention.

What is claimed is:

1. A buffer type speed difference falling protector, comprising:
   a shell (1) which is provided with an opening (10);
   a frame body (2) which is arranged in the shell (1);
   a winding device (3) which is arranged on the frame body (2), wherein a rope body can be wound when the winding device (3) rotates in a forward direction, and the rope body is released when the winding device (3) rotates in a reverse direction;
   an elastic resetting piece (4) which is used for driving the winding device (3) to rotate in the forward direction;
   a braking device (5) which is arranged on the frame body (2) and comprises a locking seat (51) with a plurality of ratchets (510), a fixing piece (52) capable of rotating synchronously with the winding device (4), a plurality of pawls (53) rotationally arranged on the fixing piece (52) and elastic pieces (54) connected with the pawls (53), wherein when the fixing piece (52) rotates to enable the centrifugal force generated by the pawls (53) to be larger than the elastic force of the elastic pieces (54), the pawls (53) are meshed with the ratchets (50) to brake the winding device (3); and
   a braking piece (312) which is matched with the winding device (3) through a multi-thread structure, wherein the braking piece (312) rotates synchronously with the winding device (3) and is tightly attached to the braking device;
   wherein a ratchet groove (511) allowing each pawl to be inserted is formed between every two adjacent ratchets (510), each pawl (53) is provided with a cantilever section (531) extending in the direction away from the rotating center of the pawl (53), each cantilever section (531) is provided with a first side edge (5311) and a second side edge (5312), and a plane perpendicular to the axis of a fixing piece (52) serves as a reference plane; the end, away from the rotating center of the corresponding pawl (53), of each cantilever section (531) is provided with a tip (532) capable of being clamped into the corresponding ratchet groove (511), each tip (532) is provided with a first cut edge (5321) connected with the corresponding first side edge (5311), and the included angle between the projection of each first cut edge (5321) on the reference plane and the projection of each first side edge (5311) on the reference plane is set to be β1; the inner wall of each ratchet groove (511) is of a polygonal structure, a first guide edge (5111), a second guide edge (5112), a third guide edge (5113) and a flange (5114) are sequentially arranged on each ratchet groove (511) in the reverse rotating direction of the fixing piece, and each ratchet (510) is composed of the flange (5114) and the first guide edge (5111) of the adjacent ratchet groove (511); the included angle between the projection of each first guide edge (5111) on the reference plane and the projection of each second guide edge (5112) on the reference plane is set to be β2, the included angle between the projection of each second guide edge (5112) on the reference plane and the projection of each third guide edge (5113) on the reference plane is set to be β3, wherein 90°<β1<β2<β3.

2. The buffer type speed difference falling protector according to claim 1, wherein 0<(β2−β1)≤30°, 0<(β3−β1)≤45°.

3. The buffer type speed difference falling protector according to claim 1, wherein the second cut edges (5322) capable of abutting against the ratchets (510) are arranged at the tips (532), the plane perpendicular to the axis of the fixing piece (52) serves as a reference plane, the included angle between the projection of each second cut edge (5322) on the reference plane and the projection of each second side edge (5312) on the reference plane is set to be θ, wherein 140°≤θ<180°.

4. The buffer type speed difference falling protector according to claim 1, wherein a gasket (55) is arranged between the locking seat (51) and the frame body (2), the thickness of the locking seat (51) in the axis direction of the fixing piece (52) is D1, the thickness of each pawl (53) in the axis direction of the fixing piece (52) is D2, wherein D1:D2=(1-3): 1.

5. The buffer type speed difference falling protector according to claim 1, wherein the plane perpendicular to the axis of the fixing piece (52) serves as the reference plane, the included angle between the projections of two side walls of the ratchets (510) on the reference plane is α, wherein 25°≤α≤45°.

6. The buffer type speed difference falling protector according to claim 1, wherein a protruding portion (520) used for limiting the pawl (53) is arranged on the fixing piece (52), the plane perpendicular to the axis of the fixing piece (52) serves as the reference plane, the projection of the axis of the fixing piece (52) on the reference plane serves as a center point C1, the projections of the two ends of the protruding portion (520) on the reference plane serve as the connecting line C1C2 and the connecting line C1C3 with the center point C1, the included angle between C1C2 and C1C3 is γ, wherein 10°≤γ≤70°.

7. The buffer type speed difference falling protector according to claim 1, wherein the winding device (3) comprises a shaft body (31) connected with the fixing piece (52) and a winding structure (32) in anti-rotation connection with the shaft body (31), and the shaft body (31) is movably connected with the frame body (2); and/or the winding structure (32) comprises a shaft sleeve (321) arranged on the shaft body (31) in a sleeved manner and a limiting disc (322) used for limiting the rope body, and the limiting disc (322) is connected with the shaft body (31); and/or the shaft body (31) is provided with a first cutting face (310), and the shaft sleeve (331) is provided with a second cutting face (330) abutting against the first cutting face (310).

8. The buffer type speed difference falling protector according to claim 1, wherein the fixing piece (52) is provided with a friction piece (522), and the braking piece (312) is tightly attached to the friction piece (522); and/or the multi-thread structure comprises a multi-thread external thread (319) arranged on the shaft body (31) and a multi-thread internal thread (318) matched with the multi-thread external thread (319), and the multi-thread internal thread (318) is arranged on the braking piece (312).

9. The buffer type speed difference falling protector according to claim 1, wherein the frame body (2) is provided with an anti-scraping structure matched with the rope body, the anti-scraping structure is a rotating roller (21) corresponding to the opening (10), and the rotating roller (21) is arranged on the lower portion of the frame body (2); and/or at least three pawls (53) are provided.

10. A buffer type speed difference falling protector, comprising:
a shell (1) which is provided with an opening (10);
a frame body (2) which is arranged in the shell (1);
a winding device (3) which is arranged on the frame body (2), wherein a rope body can be wound when the winding device (3) rotates in a forward direction, and the rope body is released when the winding device (3) rotates in a reverse direction;
an elastic resetting piece (4) which is used for driving the winding device (3) to rotate in the forward direction;
a braking device (5) which is arranged on the frame body (2) and comprises a locking seat (51) with a plurality of ratchets (510), a fixing piece (52) capable of rotating synchronously with the winding device (4), a plurality of pawls (53) rotationally arranged on the fixing piece (52) and elastic pieces (54) connected with the pawls (53), wherein when the fixing piece (52) rotates to enable the centrifugal force generated by the pawls (53) to be larger than the elastic force of the elastic pieces (54), the pawls (53) are meshed with the ratchets (50) to brake the winding device (3); and
a braking piece (312) which is matched with the winding device (3) through a multi-thread structure, wherein the braking piece (312) rotates synchronously with the winding device (3) and is tightly attached to the braking device;
wherein a gasket (55) is arranged between the locking seat (51) and the frame body (2), the thickness of the locking seat (51) in the axis direction of the fixing piece (52) is D1, the thickness of each pawl (53) in the axis direction of the fixing piece (52) is D2, wherein D1:D2=(1-3): 1.

11. A buffer type speed difference falling protector, comprising:
a shell (1) which is provided with an opening (10);
a frame body (2) which is arranged in the shell (1);
a winding device (3) which is arranged on the frame body (2), wherein a rope body can be wound when the winding device (3) rotates in a forward direction, and the rope body is released when the winding device (3) rotates in a reverse direction;
an elastic resetting piece (4) which is used for driving the winding device (3) to rotate in the forward direction;
a braking device (5) which is arranged on the frame body (2) and comprises a locking seat (51) with a plurality of ratchets (510), a fixing piece (52) capable of rotating synchronously with the winding device (4), a plurality of pawls (53) rotationally arranged on the fixing piece (52) and elastic pieces (54) connected with the pawls (53), wherein when the fixing piece (52) rotates to enable the centrifugal force generated by the pawls (53) to be larger than the elastic force of the elastic pieces (54), the pawls (53) are meshed with the ratchets (50) to brake the winding device (3); and
a braking piece (312) which is matched with the winding device (3) through a multi-thread structure, wherein the braking piece (312) rotates synchronously with the winding device (3) and is tightly attached to the braking device;
wherein the plane perpendicular to the axis of the fixing piece (52) serves as the reference plane, the included angle between the projections of two side walls of the ratchets (510) on the reference plane is α, wherein 25°≤α≤45°.

* * * * *